United States Patent
El-saidny et al.

(10) Patent No.: US 8,989,099 B2
(45) Date of Patent: Mar. 24, 2015

(54) COHERENT TRACKING AREA IN MULTI-MODE COMMUNICATION SYSTEMS

(71) Applicant: Qualcomm Incorporated, San Diego, CA (US)

(72) Inventors: Mohamed A El-saidny, Dubai (AE); Rao Sanyasi Yenamandra, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 141 days.

(21) Appl. No.: 13/779,347

(22) Filed: Feb. 27, 2013

(65) Prior Publication Data

US 2014/0044058 A1    Feb. 13, 2014

Related U.S. Application Data

(60) Provisional application No. 61/682,718, filed on Aug. 13, 2012.

(51) Int. Cl.
| | |
|---|---|
| *H04W 72/04* | (2009.01) |
| *H04W 24/02* | (2009.01) |
| *H04W 60/00* | (2009.01) |
| *H04W 88/06* | (2009.01) |

(52) U.S. Cl.
CPC ............ *H04W 72/048* (2013.01); *H04W 24/02* (2013.01); *H04W 60/00* (2013.01); *H04W 88/06* (2013.01)
USPC ......................................................... 370/328

(58) Field of Classification Search
None
See application file for complete search history.

(56) References Cited

U.S. PATENT DOCUMENTS

| | | |
|---|---|---|
| 8,259,673 B2 | 9/2012 | Diachina |
| 2008/0102896 A1 | 5/2008 | Wang et al. |
| 2010/0113015 A1 | 5/2010 | Casati et al. |
| 2011/0028154 A1 | 2/2011 | Klatt et al. |

(Continued)

FOREIGN PATENT DOCUMENTS

EP        1885141 A1    2/2008

OTHER PUBLICATIONS

Feng S., et al., "Self-Organizing Networks (SON) in 3GPP Long Term Evolution", Internet Citation, May 20, 2008, pp. 1-15, XP002526917, Retrieved from the Internet: URL: www.nomor.de [retrieved on May 5, 2009].

(Continued)

*Primary Examiner* — Kerri Rose
(74) *Attorney, Agent, or Firm* — Abdollah Kattbab

(57) ABSTRACT

Systems, methods, and devices for providing aligned registration process and procedure for heterogeneous and/or overlaid access technologies within a network are described herein. In one innovative aspect, a method of generating and organizing wireless network access information is provided. The method includes receiving first information for a first area of a first radio access technology for a network. The method further includes receiving second information for a second area of a second radio access technology for the network. The method also includes receiving third information for the network. The method then includes generating, processing, and aligning a number of groups of first radio access technology location or registration identifiers coordinated with second radio access technology identifiers based at least in part on the received first, second, and third information. The groupings may be based on the quantity of devices, types of devices, and/or the number of physical access points.

30 Claims, 6 Drawing Sheets

(56) References Cited

U.S. PATENT DOCUMENTS

| | | | |
|---|---|---|---|
| 2011/0130144 A1* | 6/2011 | Schein et al. | 455/442 |
| 2011/0176424 A1* | 7/2011 | Yang et al. | 370/236.2 |
| 2011/0195714 A1 | 8/2011 | Sawinathan | |
| 2011/0201353 A1 | 8/2011 | Voehringer | |
| 2012/0003974 A1 | 1/2012 | Nylander et al. | |
| 2012/0120789 A1 | 5/2012 | Ramachandran et al. | |
| 2012/0307735 A1 | 12/2012 | Aghili et al. | |

OTHER PUBLICATIONS

International Search Report and Written Opinion—PCT/US2013/053870—ISA/EPO—Jan. 3, 2014.

Qualcomm Europe et al., "Clarifications on ANR Blacklists and Whilelists", 3GPP Draft; R3-080933 Clarifications on ANR Blacklists and Whitelists, 3rd Generation Partnership Project (3GPP), Mobile Competence Centre; 650, Route Des Lucioles; F-06921 Sophia-Antipolis Cedex; Apr. 3, 2008, XP050668820, Retrieved from the Internet: URL: http://www.3gpp.org/ftp/tsg ran/WG3_lu/TSGR3 59bis/docs/ [retrieved on Apr. 3, 2008].

Razavi S.M., et al., "Mitigating Mobility Signaling Congestion in LTE by Overlapping Tracking Area Lists," MSWiM '11, Proceedings of the 14th ACM international Conference on Modeling, Analysis and simulation of wireless and mobile systems, 2011, pp. 285-291.

* cited by examiner

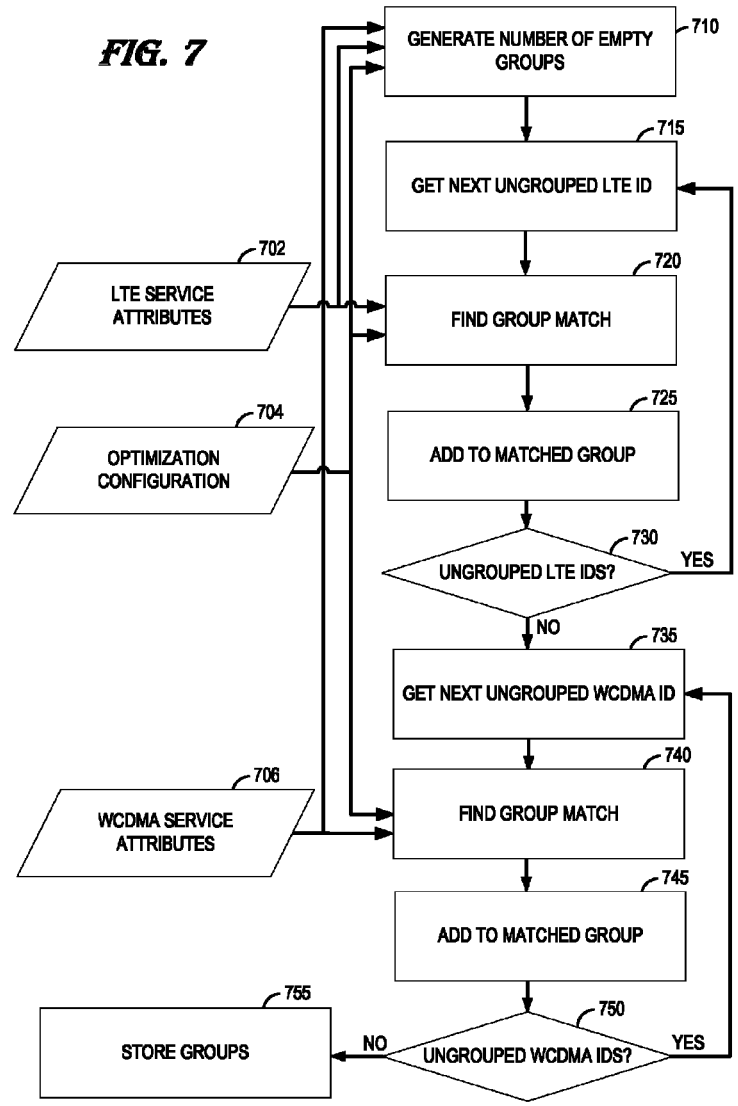

COHERENT TRACKING AREA IN MULTI-MODE COMMUNICATION SYSTEMS

CROSS-REFERENCE TO RELATED APPLICATION

This application claims benefit of priority under 35 U.S.C. §119(e) to U.S. Provisional Patent Application 61/682,718 entitled "COHERENT TRACKING AREA IN MULTI-MODE COMMUNICATION SYSTEMS" filed on Aug. 13, 2012, the disclosure of which is hereby incorporated by reference in its entirety.

BACKGROUND

1. Field

The present application relates generally to wireless communications, and more specifically to systems, methods, and devices for providing aligned registration process and procedure for heterogeneous and/or overlaid access technologies within a network are described.

2. Background

Wireless communication systems are widely deployed to provide various types of communication content such as voice and data. Wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

A subscriber may use a device capable of communicating over multiple access technologies. A device capable of communicating via multiple access technologies may be referred to as a dual mode or multimode device. Such devices may switch between access technologies based on a variety of factors such as location, battery life, device load, transmission type (e.g., data or voice), and the like. Ensuring the switching is efficient from a network signaling perspective and from a device perspective may contribute to enhanced overall network and device performance. This may ultimately impact the overall user experience when using the device.

Given the variety of deployment configurations that may exist for a given network, improved systems, methods, and devices for providing heterogeneous access technologies within a network are desirable.

SUMMARY

Various implementations of systems, methods, and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In one innovative aspect, a method of generating accurate wireless network access information for inter-radio access technology communications is provided. The method includes receiving first information for a first area of a first radio access technology for a network. The first information indicates an attribute of service provided by the first radio access technology in the first area. The method further includes receiving second information for a second area of a second radio access technology for the network. The second information indicates an attribute of service provided by the second radio access technology in the second area. The method also includes receiving an optimization configuration for the network. The method includes generating one or more groups of first radio access technology location identifiers mapped to second radio access technology location identifiers based at least in part on the first information, the second information, and the optimization configuration. Each of the groups identifies information for inter-radio access technology communication.

In another innovative aspect, a device for generating accurate wireless network access information for inter-radio access technology communications is provided. The device includes a first planning information receiver configured to receive first information for a first area of a first radio access technology for a network. The first information indicates an attribute of service provided by the first radio access technology in the first area. The device further includes a second planning information receiver configured to receive second information for a second area of a second radio access technology for the network. The second information indicates an attribute of service provided by the second radio access technology in the second area. The device also includes a network information receiver configured to receive an optimization configuration for the network. The device also includes an access information generator configured to generate one or more groups of first radio access technology location identifiers mapped to second radio access technology location identifiers based at least in part on the first information, the second information, and the optimization configuration, each of the groups identifying information for inter-radio access technology communications.

In a further innovative aspect, a non-transitory computer readable medium including instructions for generating accurate wireless network access information for inter-radio access technology communications is provided. The instructions when executed by an apparatus cause the apparatus to receive first information for a first area of a first radio access technology for a network. The first information indicates an attribute of service provided by the first radio access technology in the first area. The instructions also cause the apparatus to receive second information for a second area of a second radio access technology for the network. The second information indicates an attribute of service provided by the second radio access technology in the second area. The instructions further cause the apparatus to receive an optimization configuration for the network. The instructions also cause the apparatus to generate one or more groups of first radio access technology location identifiers mapped to second radio access technology location identifiers based at least in part on the first information, the second information, and the optimization configuration, each of the groups identifying information for inter-radio access technology communications.

In yet another innovative aspect, an apparatus for generating wireless network access information is provided. The apparatus includes means for receiving first information for a first area of a first radio access technology for a network. The first information indicates an attribute of service provided by the first radio access technology in the first area. The apparatus includes means for receiving second information for a second area of a second radio access technology for the network. The second information indicates an attribute of service provided by the second radio access technology in the second area. The apparatus includes means for receiving an optimization configuration for the network. The apparatus also includes means for generating one or more groups of first radio access technology location identifiers mapped to second radio access technology location identifiers based at least in part on the first information, the second information, and the optimization configuration, each of the groups identifying information for inter-radio access technology communications.

In some implementations of the innovative aspects discussed above, generating the groups may include determining a number of groups to generate, the determining based at least in part on the first information, the second information, and the optimization configuration. Generating the groups may also include associating a location identifier for the first radio access technology with a location identifier for the second radio access technology, wherein at least a portion of a coverage area of the first radio access technology overlaps with at least a portion of the a coverage area of the second radio access technology. Generating the groups may further include assigning the associated identifiers to one of the groups based at least in part on a proximity of the coverage areas for the associated identifiers to coverage areas for identifiers included in the groups.

In some implementations of the innovative aspects discussed above, the first radio access technology may be long term evolution. In such implementations, the attribute of service provided by the first radio access technology in the first area may include at least one of a physical cell identifier of the first area, quantity of tracking area updates within the first area, quantity of devices within the first area, type of devices within the first area, and a prevailing type of traffic within the first area. In such implementations, the first radio access technology location identifiers may include at least one of a tracking area identifier and a tracking area list.

In some implementations of the innovative aspects discussed above, the second radio access technology may be one of WCDMA or GSM. In such implementations, the attribute of service provided by the second radio access technology in the second area may include one or more of a primary scrambling code of the second area, base station identity code, quantity of location area updates within the second area, quantity of devices within the second area, type of devices within the second area, and a prevailing type of traffic within the second area. In such implementations, the second radio access technology location identifiers may include a location area identifier.

The optimization configuration may include one or more of a weighting factor, a static parameter, a semi-static parameters, and a dynamic parameter for at least one of the first information and the second information. The network may include one or more of a self-organizing engine and a self-optimizing engine. In some implementations, the first radio access technology and the second radio access technology may include heterogeneous and/or overlaid radio access technologies. Furthermore, at least one of the first radio access technology and the second radio access technology include one or more of a macro node, a micro node, a pico node, a femto node, an indoor node, an outdoor node, and a home node.

These and other implementations consistent with various innovative aspects are further described below with reference to the following figures.

BRIEF DESCRIPTION OF THE DRAWINGS

FIG. 7 illustrates a process flow diagram of an example of an optimization process incorporating aspects described above.

Figure 1:
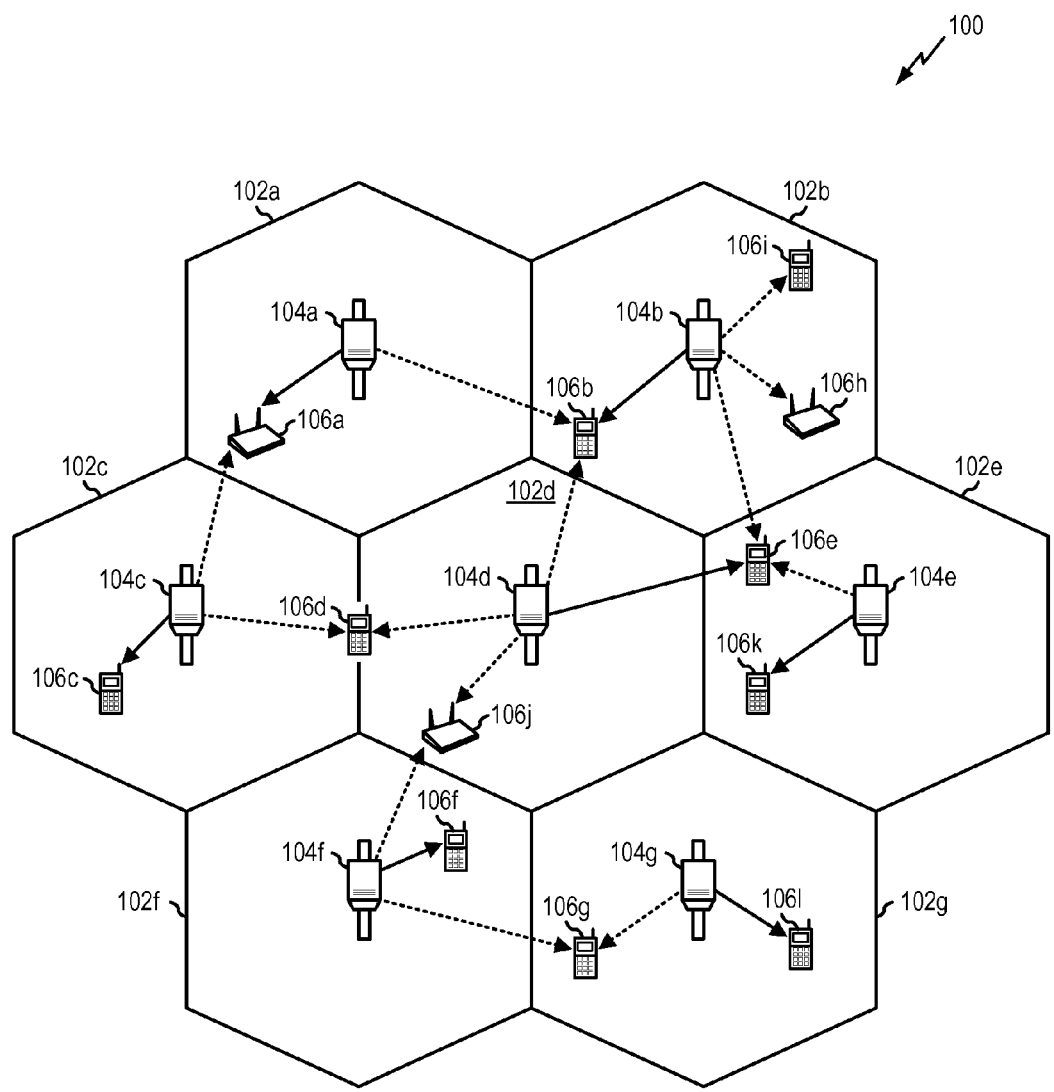
FIG. 1 illustrates an example of a wireless communication network or system in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the aspects described herein. Details are set forth in the following description for purpose of explanation. It should be appreciated that one of ordinary skill in the art would realize that the features may be practiced without the use of these specific details. In other instances, well known structures and processes are not elaborated in order not to obscure the description with unnecessary details. Thus, the present disclosure is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Wideband Code Division Multiple Access (WCDMA) is one example of an interface that may be included in UMTS. Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). Some communication systems may include and/or implement a GSM Edge radio access network (GERAN). These various radio technologies and standards are known in the art.

Furthermore, in the following description, for reasons of conciseness and clarity, terminology associated with specific systems (e.g., UMTS, LTE) may be used. It should be emphasized that the disclosed techniques may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

One entity which may be included in a multi-mode wireless communication system to help manage the dynamic nature of the system is a self-organizing/self-optimization (SON) entity. A SON entity may be a stand-alone entity in data communication with the access points included in a multi-mode wireless communication system. A SON entity may be included in one or more access point in data communication with other access points included in a multi-mode wireless communication system.

The SON entity may be configured to monitor and adjust aspects of wireless communication system planning, deployment, optimization, and maintenance over time. For example, the SON entity may be configured to adjust access point parameters such as radio parameters, transport parameters, or data alignment. The SON entity may provide optimization for neighbor lists, interference control, handover, quality of service, and the like.

The self-organization and/or self-optimization are based on monitored aspects of the wireless communication system. Accordingly, the types and quality of organizing and optimizing that may be achieved by the SON entity are affected by the information provided to the SON entity.

In some implementations, the SON entity may be configured to perform traffic area optimization (TAO). The SON entity may include a TAO engine to monitor tracking area updates (TAU) and the load on the radio access channel (RACH) to continuously identify the access points that may benefit from a change in traffic area identifier assignment (e.g., change which tracking area list the access point is included on). This optimization however is focused solely on the tracking area optimization for LTE. In such implementations, the TAO engine may not consider location information which may be used by other radio access technologies such as WCDMA or GSM and how the location information aligns between the radio technologies.

FIG. 1 illustrates an example of a wireless communication network or system 100 in which aspects of the present disclosure may be employed. The wireless communication network 100 may operate pursuant to a wireless standard, for example the LTE Advanced standard, LTE standard, WiMax standard, GSM standard, EDGE standard, 802.11ah standard, WiFi Advanced-N standard, and so forth. The wireless communication system 100 may include an access point (AP) 104, which communicates with stations (STAB) 106.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or be known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with W-CDMA or CDMA techniques. If this is the case, the wireless communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may be configured as a base station and provide wireless communication coverage in a basic service area (BSA) 102. Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may be configured to provide access via one or more technologies. For example, an AP 104 may be configured to provide WCDMA access and LTE access. In such implementations, the STA 106 may be located in a basic service area 102 that includes WCDMA and LTE coverage. The STA 106 may be configured to prefer one access technology over another. For example, the STA 106 may be configured to use LTE if available. However, in the event the STA 106 initiates or receives a circuit switched communication (e.g., voice call or SMS text message), the STA 106 may switch to WCDMA.

The wireless communication system 100 may include a self-organizing/self-optimizing entity. The self-organizing/self-optimizing entity may be in data communication with one or more AP 104 included in the wireless communication system 100. The self-organizing/self-optimizing entity may be configured to monitor and adjust aspects of the APs 104 such as generating tracking area lists as will be described in further detail below.

Figure 2:
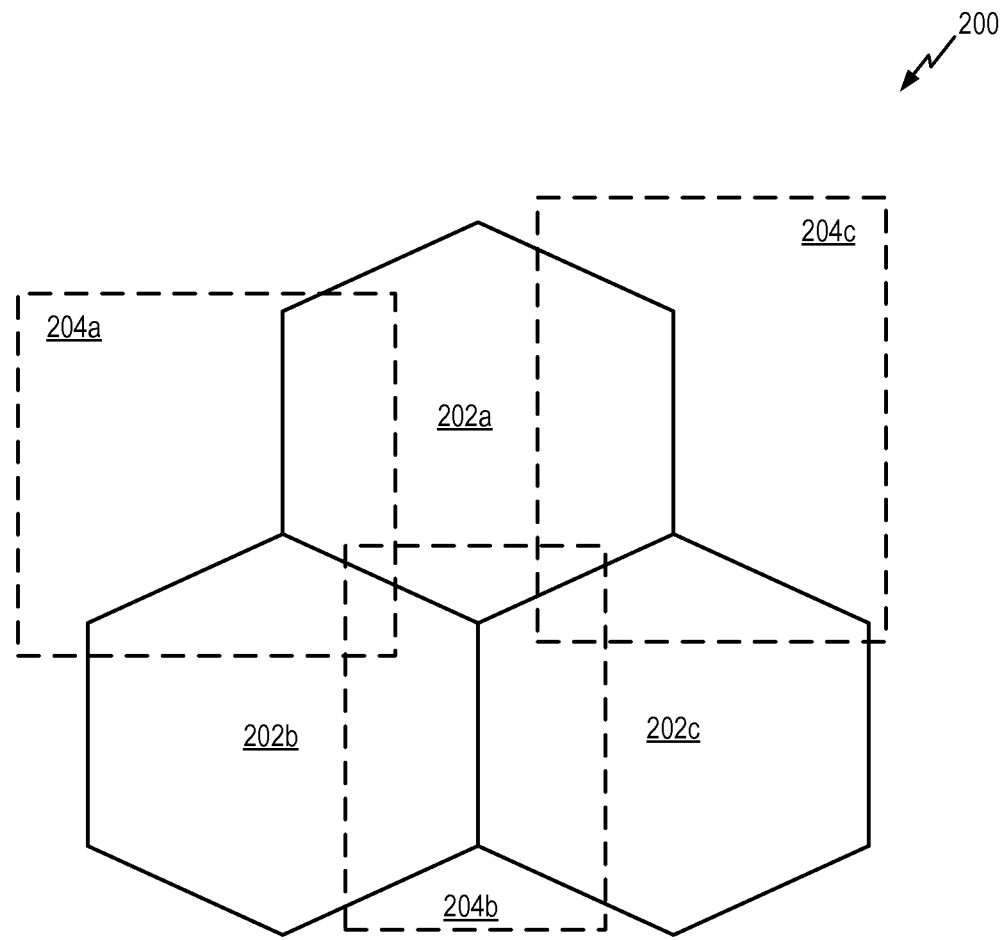
FIG. 2 illustrates an example of a wireless communication network or system including collocated access technologies.

FIG. 2 illustrates an example of a wireless communication network or system including collocated access technologies. The wireless communication network 200 includes a first group of basic service set areas 202a, 202b, and 202c. These basic service set areas 202a, 202b, and 202c may correspond to WCDMA cells. In some implementations, a cell may be associated with a location area code (LACs). The wireless communication network 200 also includes a second group of basic service set areas 204a, 204b, and 204c. These basic service set areas 204a, 204b, and 204c may correspond to LTE coverage areas. In some implementations, an area may be associated with a tracking area code (TAC).

As a device moves through the wireless communication network 200, the device maintains information for both groups of services. As shown in the wireless communication network 200 of FIG. 2, as a device moves from an area associated with one group to another area, the area associated with the other group may or may not change. For example, a device may be initially located in areas 204a and 202b. The device may then move across the cell boundary into area 202a. At this point, the device has maintained the proper location information for the second group (e.g., 204a), but needs to update the location information for the first group (e.g., from 202b to 202a).

Minimizing the amount of updating included to maintain the appropriate location information provides several non-limiting advantages. For example, reducing the updating may reduce the call setup time as the device may not need to update its location prior to sending or receiving a call. Performing a location area update may add delay to the call set up. The location area update may include additional non-access stratum (NAS) signals to the circuit switch call. However, in such implementations, these additional messages introduce delay on the access stratus due to the size of the messages and latencies corresponding to sending them via the air interface of the communication medium before proceeding to establish the circuit switch call.

These latencies can affect the overall user experience, device performance, and network performance. Reducing the updating may also lower the power and processing requirements for the device because fewer signals may be needed to maintain the location information. From the wireless communication network 200 perspective, reduced updating may reduce the power and processing requirements of the access points as fewer update signals need be processed and exchanged with devices moving through the wireless communication network 200. This traffic reduction may also improve the performance the wireless communication network 200 as fewer overhead signals may be transmitted thereby providing more bandwidth for communications signals and for other devices (e.g., voice and/or data). The devices may also utilize an improved experience as call setup time may be reduced due to reduced exchanged signaling. The reduced signaling may also improve the power usage for the device and reduce the processing time for the device as fewer signaling messages may be generated and transmitted to set up a call.

Figure 3:
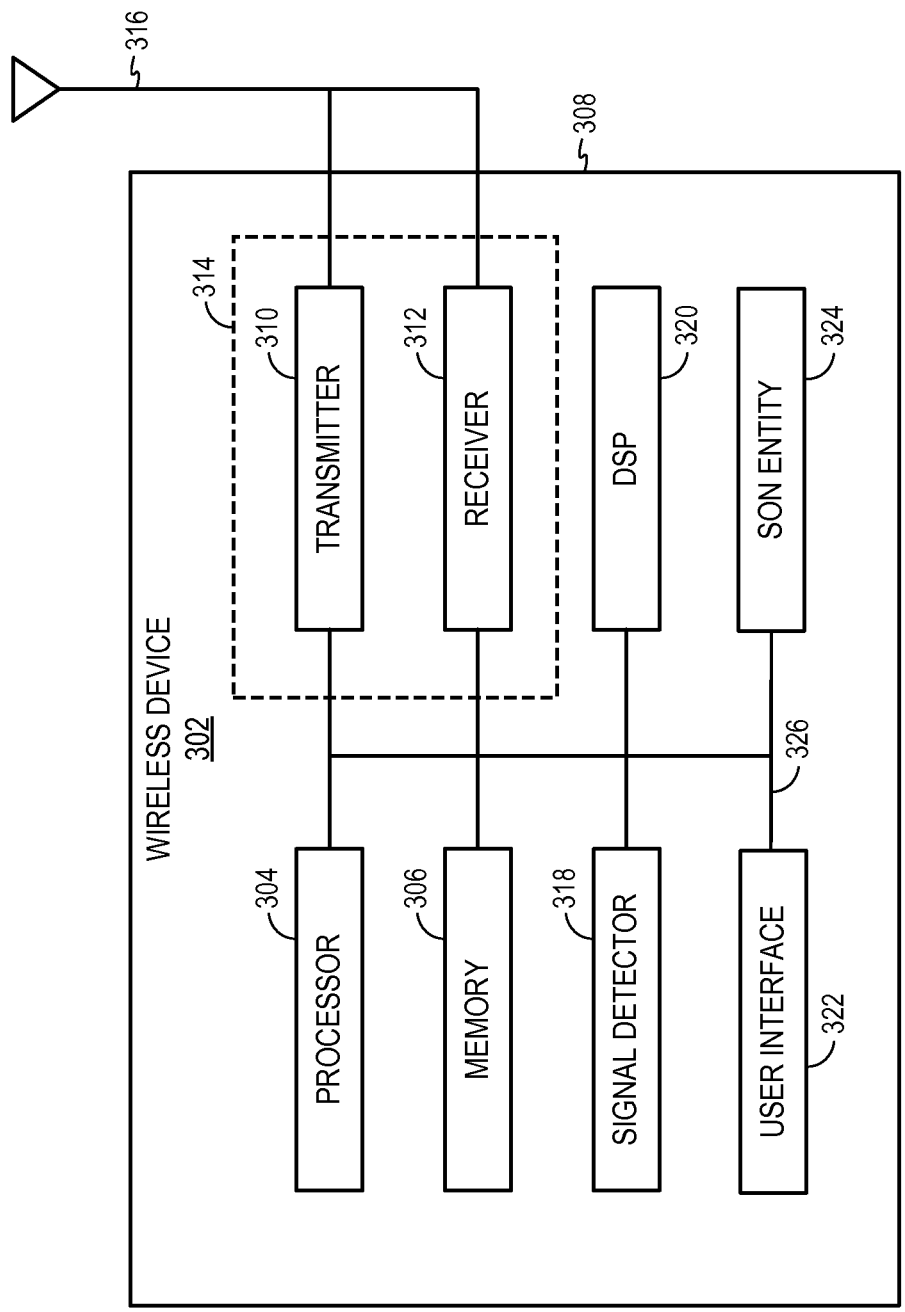
FIG. 3 illustrates an example of a functional block diagram of a wireless device that may be employed within a wireless communication network.

FIG. 3 illustrates an example of a functional block diagram of a wireless device that may be employed within a wireless communication network. The wireless device 302 is an example of a device that may be configured to implement the various methods described herein. For example, the wireless device 302 can be implemented in a STA, a UE, an AT, a subscriber station, a subscriber unit, a mobile station, a remote station, a remote terminal, a user terminal, a user agent, a user device, etc. As another example, the wireless device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the wireless device 302 (e.g., through an interface 322, SIM card, download, over the air). The processor 304 may perform logical and arithmetic operations further based on the configuration data.

In some aspects, the processor 304 is configured to cause signals to be sent and receive signals from another device (e.g., AP 104, STA 106, etc.). The signals may include mobility or session management signals to allow applications running on the wireless device 302 to access network services. In some aspects, the processor 304 is further configured to control how and when the management signals will be transmitted. For example, in some implementations, the wireless device 302 may move from one location to another. As a result of the movement, the AP 104 previously providing network services to the wireless device 302 may no longer be within range. Accordingly, the wireless device 302 may need to transfer to a new AP 104. This is generally referred to as mobility management.

In some implementations, the processor 304 may be configured to cause the transmission of a signal indicating the location change. For example, for LTE communications, a tracking area update (TAU) signal may be transmitted by the wireless device 302. For WCDMA communications, a location area update signal may be transmitted by the wireless device 302.

The wireless device 302 may include a self-organizing/self-optimization entity 324. As discussed above, in some implementations, the SON entity 324 may be in communication with one or more wireless devices. Although shown in the wireless device 302 in FIG. 3, in some implementations, the SON entity 324 may be implemented apart from the wireless device 302.

As discussed above, in self-organizing/self-optimizing networks, the definition of tracking areas may change over time. For example, as new LTE access points come online, the network may self-organize to optimally define service areas for each access point. As the LTE areas are updated, the associated WCDMA cells may also be changed. For example, if a single LTE coverage area spanned two WCDMA cells at a first point in time, the tracking area identifier associated with the LTE coverage area may be associated with the location area code associated with the WCDMA cells. If a second LTE access point was brought online with a coverage area including one WCDMA cell, the original LTE access point may cover the other WCDMA cell. Accordingly, the association between tracking area identifiers and location area codes would need to be updated to reflect the new network topology.

Once initial deployment of tracking area assignment per access point is complete, a traffic area optimization engine actively monitors the wireless network. The tracking area optimization (TAO) engine may monitor tracking area updates (TAU) and the load on the radio access channel (RACH) to continuously identify the access points that may benefit from a change in traffic area identifier assignment (e.g., change which tracking area list the access point is included on). The traffic area optimization engine may identify mobility patterns for devices with each access point. For example, when a mobile performs a tracking area update, the TAO engine generates a tracking area list that contains a set of tracking areas which minimizes the change of the mobile moving out of that set of tracking areas. As a result, one implementation of such an optimization engine can generate a tracking area list including the new tracking area code and the last visited tracking area code in a group that would minimize ping-ponging between multiple access points. The TAO engine is configured to identify such access points and allocate them to appropriate tracking area(s). While useful for cases when tracking area and location area boundaries are in close alignment, when allocating access points to tracking areas, such implementations may not consider information about tracking area lists can be generated such that they span multiple location area boundaries. These tracking area lists may impact circuit switched fallback call performance when initiated in the non-registered location area.

When the wireless device 302 is implemented as an AP 104, the wireless device 302 may be configured to receive registration signals from STAs 106 entering the service area provided by the AP 104. If the STA 106 entering the service area is new to the service area, the wireless device 302 may exchange signals with the STA 106 to attach to the network. In a dual mode system, a combined attach may be performed wherein the STA 106 exchanges signals with one mode to affect the attachment to both modes. In such implementations, the AP 104 receiving the combined attach request may perform additional signaling with an AP providing other modes of communication to attach the STA 106.

If the STA 106 entering the service area has a tracking area code, the STA 106 may determine if the TAC is the same as the TAC for the AP 104 of the service area the STA 106 is located in. If they are different, an update of the location information (e.g., tracking area code, tracking area list, and location area code) may be performed.

The SON entity 324 may be configured to identify the tracking area list and align location area codes with the tracking area codes included in the list. The alignment will be described in further detail below. This may reduce the amount of location/tracking signaling to transmit tracking area identifier and location area code information to a STA 106. In some implementations, multiple tracking area identifiers and location area codes may be grouped such as via one or more tracking area lists.

The processor 304 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that includes the transmitter 310 and/or the receiver 312 to allow transmission and reception of data between the wireless device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals. The DSP 320 may be configured to generate a packet for transmission and/or process a received packet.

In some aspects, the wireless device 302 may further comprise a user interface 322. The user interface 322 may comprise a keypad, a microphone, a speaker, and/or a display. The user interface 322 may include any element or component that conveys information to a user of the wireless device 302 and/or receives input from the user.

The various components of the wireless device 202 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the wireless device 302 may also be implemented as a combination of computing devices, e.g., a combination of a DSP and a microprocessor, a plurality of microprocessors, one or more microprocessor in conjunction with a DSP communication, or any other such configuration.

Figure 4:
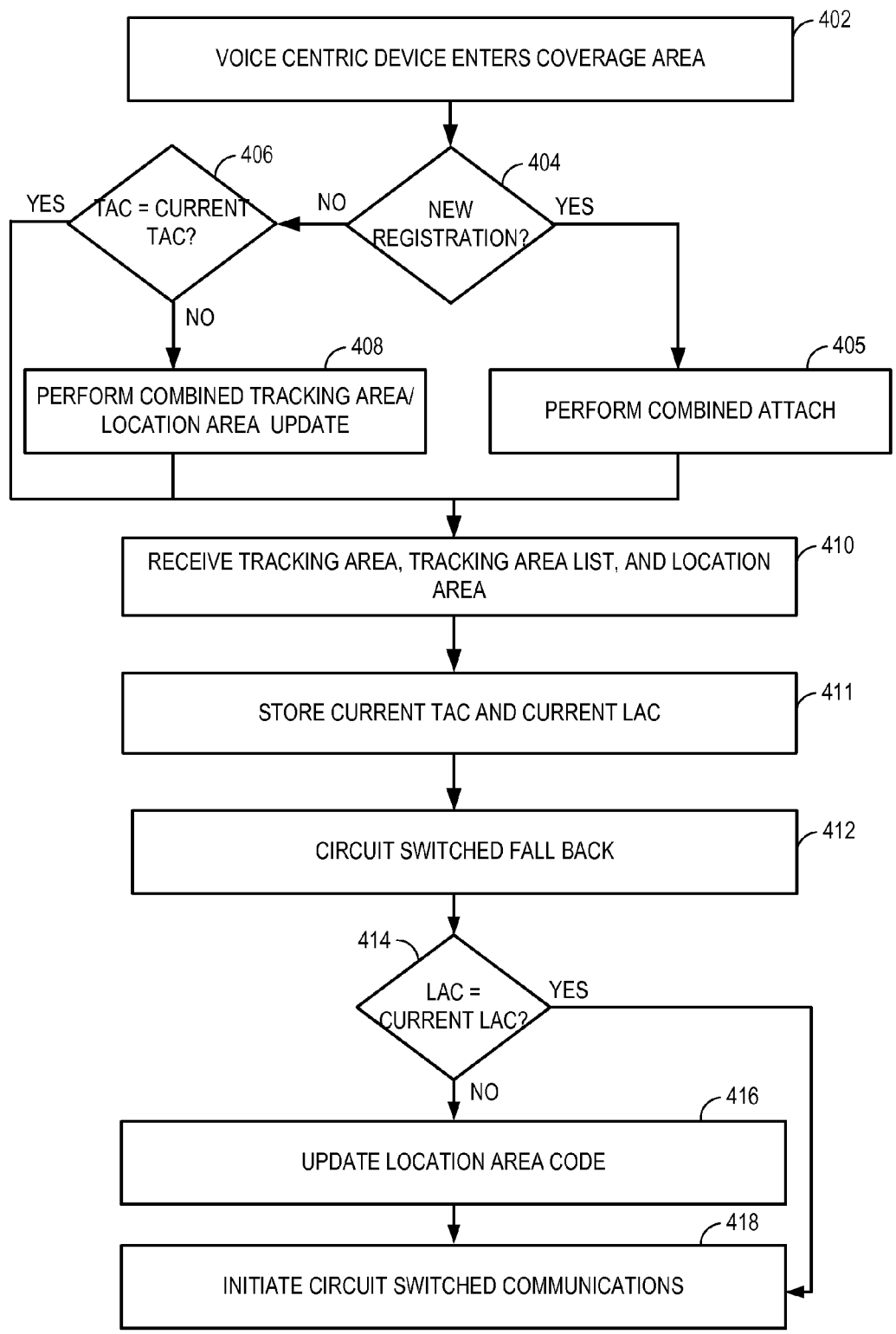
FIG. 4 illustrates a process flow diagram for an exemplary initiation of a circuit switched fallback in a mobility setting.

FIG. 4 illustrates a process flow diagram for an exemplary initiation of a circuit switched fallback in a mobility setting. FIG. 4 shows how a dual mode, LTE and WCDMA, device handles mobility and tracking/location area updating in relation to initiating a circuit switched fallback call. Generally, the device is actively associated with the LTE network and will fall back to the WCDMA to initiate a voice call.

At block 402, the voice centric device enters a coverage area. At decision block 404, a determination is made as to whether the device is newly registered (e.g., no tracking area information). If the device has no registration information, at block 405 a combined attached to LTE and WCDMA is performed. Returning to decision block 404, if the device has previously registered, the process continues to block 406 where the tracking area code (TAC) of the coverage area is compared with the current TAC stored by the device. If the determination is made that the current TAC is the same as the TAC for the coverage area, the flow continues to block 410 as described below. If the determination is made that the current TAC is not the same as the TAC for the coverage area, at block 408 the device performs a combined tracking area and location area update.

At block 410, the device receives a tracking area list. The tracking area list includes tracking area codes and associated location area codes for the device's current location. At block 411 the device stores the current TAC and current LAC such as in the memory 306. At block 412 the circuit switched fallback call is initiated. At decision block 414, a determination is made as to whether the location area code (LAC) including in the system information block of the access point that will service the call is the same as the current location area code stored by the device. If so, the flow continues to block 418 with the initiation of the circuit switch fallback communication.

Returning to decision block 414, if the location area code is not the same as the current location area code stored by the device, the process continues to block 416. At block 416, the device performs a location area update with the WCDMA network. Once the current location area code has been updated for the device, the flow continues to block 418 as described above.

Returning to decision block 410, if the device has changed area, at block 410 the device determines whether the tracking area identifier for the new area is included in the received tracking area list. If the new area is included in the list, the process continues to block 412 as described above. If the new area is not included in the list, the process returns to block 404 to perform the combined tracking area and location area update as described above.

The tracking area list is generated by the tracking area optimization engine discussed above. As shown in FIG. 4, a list may include many tracking area codes. This may avoid the update of block 404. However, this may result in a negative determination at block 414 leading to a location area update. Conversely, a list may include few tracking area codes. This may reduce the number of negative determinations at block 414 and thus avoid the location area update of block 416. However, this may cause an increased number of combined updates at block 404.

Establishing the right balance between tracking area updates and location area updates can improve the overall network performance in part by aligning location area boundaries with tracking area list boundaries. In self-organizing and/or self-optimizing networks, taking into account not only tracking area updates, but also location area updates when generating the tracking area lists may produce more efficient optimizations. By including these factors for consideration, the network management entity may be configured to more closely align the tracking area and tracking area list boundary with the location area boundary. For example, a network operator may determine that LTE is fast and inexpensive as compared to WCDMA. As such, the network operator may favor shorter tracking area lists which may result in more tracking area updates and fewer location area updates. In some implementations for such a network operator, an optimization configuration may be provided which causes the organization of location information to favor LTE over WCDMA.

As another example, the network operator may prioritize voice-centric devices (e.g., likely to perform circuit switch fallback communications) over data-centric devices. As such, the network operator may again favor shorter tracking area lists which may result in more tracking area updates and fewer location area updates. Such preference may be provided in an optimization configuration. The number of voice-centric and/or data-centric devices (forecasted, planned, or deployed in any RAN) may be used as an input to the traffic area optimization to generate tracking area lists.

In some implementations, the optimization configuration may include a weighting hysteresis. The weighting hysteresis may be applied in an autonomous or semi-autonomous fashion to broadcast registration area static, semi-static, or dynamic parameters, to generate this preference. These preferences may be expressed as a weighting factor included in the optimization such that one radio access technology is favored over another. In addition to aligning the boundaries for tracking areas and location areas of the system, consideration of these factors may also increase the stability of the system. For example, when location area boundaries are moved, new LTE or WCDMA cells are added, or LTE or WCDMA cells are removed, the optimization may need to be reconsidered.

Table 1 below illustrates one example configuration for a wireless communication network. The configuration includes tracking area lists (e.g., three groups). Each group includes two tracking area codes and an associated location area code.

TABLE 1

| Tracking Area List | TAC | LAC |
|---|---|---|
| 1 | 215 | 1111 (0x0457) |
|   | 216 | 1112 (0x0458) |
| 2 | 217 | 1113 (0x0459) |
|   | 218 | 1114 (0x045A) |

TABLE 1-continued

| Tracking Area List | TAC | LAC |
|---|---|---|
| 3 | 219 | 1115 (0x045B) |
|   | 220 | 1116 (0x045C) |

In a network configured according to the example shown in Table 1, assume a user equipment is camped on TAC 218. This may be where LAC was last updated (e.g., through TAU procedure). If the user equipment roams to TAC 217, no tracking area update procedure will be initiated because TAC 218 and TAC 217 are included on the same list, tracking area list 2. When the user equipment attempts a circuit switch fallback (CSFB) communication from TAC 217, the user equipment will perform a location area update in WCDMA upon circuit switch call establishment.

The configuration shown in Table 1 reduces TAU procedure overhead, but can increase location area update (LAU) procedure overhead for CSFB mobility users due to lack of frequent TAU procedures within TACs in same tracking area lists.

Table 2 shows another possible configuration for a wireless communication network. The configuration includes one tracking area list (e.g., one group). The group includes six tracking area codes and an associated location area code.

TABLE 2

| Tracking Area List | TAC | LAC |
|---|---|---|
| 1 | 215 | 1111 (0x0457) |
|   | 216 | 1112 (0x0458) |
|   | 217 | 1113 (0x0459) |
|   | 218 | 1114 (0x045A) |
|   | 219 | 1115 (0x045B) |
|   | 220 | 1116 (0x045C) |

In a network configured according to the example shown in Table 2, assume a user equipment is camped on TAC 218. This may be where LAC was last updated (e.g., through TAU procedure). If the user equipment roams to TAC 217, no tracking area update procedure will be initiated because TAC 218 and TAC 217 are included on the same list, tracking area list 1. When the user equipment attempts a circuit switch fallback communication from TAC 217, the user equipment will perform a location area update in WCDMA upon circuit switch call establishment.

While this example is similar to the network described in reference to Table 1, the frequency of LAU procedure for CSFB calls will be much higher than the network described in reference to Table 1 because no TAU procedure is performed for mobility LTE users. Accordingly, the LAC may not match when the CSFB call is attempted. This configuration significantly reduces TAU procedure overhead, but may increase LAU procedure overhead for CS calls in WCDMA and increase paging load for LTE. In some networks, this signaling tradeoff may be desirable based on the characteristics of the network, quantity of devices, types of devices (e.g., voice-centric or data-centric), base station identity codes associated with the access points, and number of physical access points.

Table 3 shows another possible configuration for a wireless communication network. The configuration includes six tracking area list (e.g., six groups). Each group includes one tracking area code and an associated location area code.

TABLE 3

| Tracking Area List | TAC | LAC |
|---|---|---|
| 1 | 215 | 1111 (0x0457) |
| 2 | 216 | 1112 (0x0458) |
| 3 | 217 | 1113 (0x0459) |
| 4 | 218 | 1114 (0x045A) |
| 5 | 219 | 1115 (0x045B) |
| 6 | 220 | 1116 (0x045C) |

In a network configured according to the example shown in Table 3, assume a user equipment is camped on TAC 218. This may be where LAC was last updated (e.g., through TAU procedure). If the user equipment roams to TAC 217, a tracking area update procedure will be initiated because TAC 218 is included in tracking area list 4 rather than the same list as TAC 217 (e.g., tracking area list 3). When the user equipment attempts a circuit switch fallback communication from TAC 217, the user equipment will not perform a location area update in WCDMA upon circuit switch call establishment because the LAC associated with TAC 218 is the current location of the user equipment.

This configuration shown in Table 3 increases TAU procedure overhead, but reduces LAU procedure overhead for CSFB mobility as well increasing paging capacity for LTE. In some networks, this signaling tradeoff may be desirable based on the characteristics of the network, quantity of devices, types of devices (e.g., voice-centric or data-centric), and number of physical access points.

The techniques describe may prevent any mismatch between TAC and LAC planning in networks of voice-centric devices where CSFB allowed by considering information from both radio access technologies when defining/optimizing the network access information. Mismatches may be created during static TAC/LAC planning due to configuration issues such as imprecise geospatial, human configuration error, or the like. Mismatches may also be introduced during dynamic TAC/LAC in current self-organizing network TAO implementation, where LAC is not considered as part of the TAO process.

A self-organizing system which considers TAC and LAC information may identify such inconsistencies and correct them through the allocations within tracking area list(s). Several non-limiting advantages include reduced circuit switched call setup latencies for CSFB type calls, reduce signaling overhead in WCDMA, and improved device battery standby time, especially for mobility users in dense LTE deployments.

Further non-limiting advantages include providing the network access information on the network side rather than by changing the user equipment, efficient handling and considerations of tracking area planning and optimization especially for voice-centric devices, and enhanced self-organizing network functionality to avoid manual and/or static (semi) autonomous tracking area to location area coordination and planning.

Figure 5:
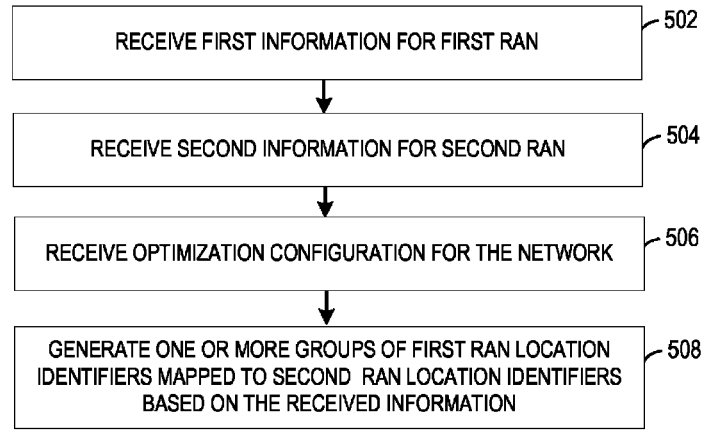
FIG. 5 illustrates a process flow diagram for an exemplary method of generating accurate wireless network access information for inter-radio access technology communications.

FIG. 5 illustrates a process flow diagram for an exemplary method of generating accurate wireless network access information for inter-radio access technology communications. The process shown in FIG. 5 may be implemented in whole or in part by one or more of the devices described herein such as the wireless device 302 described above and shown in FIG. 3 or an apparatus as will be described below in reference to FIG. 6.

At node 502, first information for a first area of a first radio access technology for a network is received, the first information indicating an attribute of service provided by the first radio access technology in the first area. At node 504, second information for a second area of a second radio access technology for the network is received, the second information indicating an attribute of service provided by the second radio access technology in the second area. At node 506, an optimization configuration for the network is received. At node 508, one or more groups of first radio access technology location identifiers mapped to second radio access technology location identifiers are generated. The groupings are based at least in part on the first information, the second information, and the optimization configuration.

Figure 6:
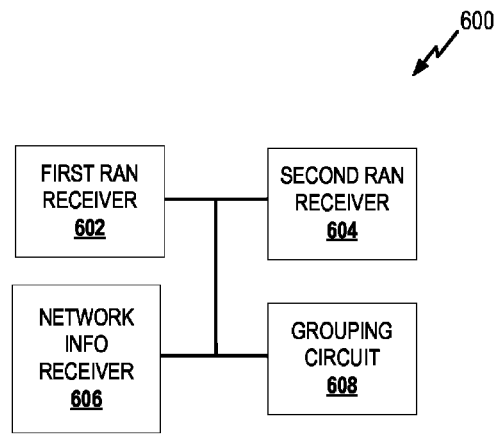
FIG. 6 illustrates a functional block diagram of an apparatus for generating accurate wireless network access information for inter-radio access technology communications.

FIG. 6 illustrates a functional block diagram of an apparatus for generating accurate wireless network access information for inter-radio access technology communications. Those skilled in the art will appreciate that a device may have more components than the simplified apparatus 600 shown in FIG. 6. The apparatus 600 shown includes only those components useful for describing some prominent features of implementations within the scope of the claims. The apparatus 600 includes a first RAN receiver 602, a second RAN receiver 604, a network information receiver 606, and a grouping circuit 608.

The first RAN receiver 602 is configured for receiving first information for a first area of a first radio access technology for a network, the first information indicating an attribute of service provided by the first radio access technology in the first area. The first RAN receiver 602 may include a network interface, a transceiver, an antenna, a digital signal processor, and a memory. In some implementations, means for receiving first information may include the first RAN receiver 602.

The second RAN receiver 604 is configured for receiving second information for a second area of a second radio access technology for the network, the second information indicating an attribute of service provided by the second radio access technology in the second area. The second RAN receiver 604 may include a network interface, a transceiver, an antenna, a digital signal processor, and a memory. In some implementations, means for receiving second information may include the second RAN receiver 604.

The network information receiver 606 is configured means for receiving an optimization configuration for the network. The network information receiver 606 may include a network interface, a transceiver, an antenna, a digital signal processor, and a memory. In some implementations, means for receiving an optimization configuration includes the network information receiver 606.

The grouping circuit 608 is configured for generating one or more groups of first radio access technology location identifiers mapped to second radio access technology location identifiers based at least in part on the first information, the second information, and the optimization configuration. The grouping circuit 608 may include a network interface, a processor, a digital signal processor, a comparator, an adder, and a memory. In some implementations, means for one or more groups of first radio access technology location identifiers mapped to second radio access technology location identifiers may include the grouping circuit 608.

FIG. 7 illustrates a process flow diagram of an example of an optimization process incorporating aspects described above. The process shown references long term evolution system and a WCDMA system. This is only one example. Other radio access technologies may be used as part of another implementation of the aspects described. The process shown in FIG. 7 may be implemented in whole or in part by one or more of the devices described herein such as the wireless device 302 described above and shown in FIG. 3 or an the apparatus 600 described above and shown in FIG. 6.

The process shown in FIG. 7 receives three inputs. LTE service attributes 702 are provided. The LTE service attributes 702 may include physical cell identifiers for a coverage area, a quantity of tracking area updates within the coverage area, the quantity of devices within a coverage area, one or more types of devices within the coverage area, and/or a prevailing traffic type within the coverage area. The LTE service attributes 702 may be stored in a memory. The LTE service attributes 702 may be derived from actual network usage. For example historical tracking area updates over a period of time may be analyzed and include in the LTE service attributes 702.

WCDMA service attributes 706 are shown in FIG. 7. The WCDMA attributes 706 may include a primary scrambling code for a coverage area, a base station identity code associated with the coverage area, a quantity of devices within the service area, and/or a prevailing traffic type within the coverage area. As with the LTE service attributes 702, the WCDMA service attributes 706 may be stored in a memory. The WCDMA service attributes 706 may be derived from actual network usage. For example historical location area updates over a period of time may be analyzed and included in the WCDMA service attributes 706.

An optimization configuration 704 may also be included in the process shown in FIG. 7 the optimization configuration may include a weighting factor, a static parameter, a semi-static parameter, and/or a dynamic parameter for the service attributes. The optimization configuration 704 may be used preferred network configurations for an operator as discussed above.

The three inputs, the LTE service attributes 702, the optimization configuration 704, and the WCDMA service attributes 706, may be provided to generate a number of empty groups at node 710. As discussed above, the number of groups can affect how often tracking area and or location area updates are performed. Based on the operator's preferences, as expressed through the optimization configuration 704, in relation to the attributes of the service (e.g., the LTE service attributes 702 and the WCDMA service attributes 706), a number of groups for the network may be prepared. For example, it may be desirable to include two tracking area identifiers per group. This configuration generally corresponds to that shown in Table 1 above.

At node 715, the next ungrouped LTE location area identifier is obtained. The ungrouped LTE ID may be provided to the system as a new LTE access point is added to the network. At node 720, a group match for the ungrouped LTE identifier is found. The match may be based on the LTE service attributes 702 and/or the optimization configuration 704. For example a group may include an LTE location ID corresponding to a first service area. An ungrouped LTE location ID may correspond to a service area associated with the grouped LTE location ID for the first service area. The correspondence may be based on tracking area updates, physical location, or other LTE service attributes.

At node 725, the identifier is added to the matched group. The ungrouped LTE ID may be the first ID added to a group. This may be the case when a new configuration is being generated.

In some circumstances, finding a group match at node 720 and adding to the matched group at node 725 may include replacing an existing member of a group with the current LTE ID being placed. For example, consider the case where two identifiers have been grouped in a single group based on a 10% overlap of coverage areas. If the current LTE ID is associated with a coverage area which overlaps one of the coverage areas associated with the grouped identifiers by greater than 10%, the current LTE ID may replace the identifier associated with the coverage area having a lesser overlap. The overlap threshold may be included in the optimization configuration 704.

At decision node 730, a determination is made as to whether there are ungrouped LTE IDs remaining. If so, the process returns to block 715 to obtain the next ungrouped LTE ID. If not, the process continues to node 735 where a similar process is performed to assign WCDMA identifiers to the groups.

At node 735, the next ungrouped the lease CDMA identifier is obtained. At node 740, a group is found which matches the ungrouped WCDMA identifier. The matching may be based on the WCDMA service attributes 706 and/or the optimization configuration 704. The matching may further be based on the LTE identifier(s) assigned to the groups. For example, a physical location associated with an LTE ID included in a group may be compared to a physical location associated with the current WCDMA location identifier. At block 745, the current WCDMA identifier is added to the matched group. As discussed above, the WCDMA identifier may replace a previously added WCDMA identifier should a more desirable match be found. At node 750, a determination is made as to whether additional ungrouped WCDMA identifiers exist. If so, the process returns to node 735 and processes the next ungrouped WCDMA identifier. If not, the process continues to node 755 where the groups are stored.

The process shown in FIG. 7 begins with the LTE grouping and then adds the WCDMA IDs to the groupings. In some implementations, the process may begin by assigning WCDMA IDs to the groups and then adding LTE information to each group.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of generating accurate wireless network access information for inter-radio access technology communications, the method comprising:
   receiving first information for a first area of a first radio access technology for a network, the first information indicating an attribute of service provided by the first radio access technology in the first area;
   receiving second information for a second area of a second radio access technology for the network, the second information indicating an attribute of service provided by the second radio access technology in the second area;
   receiving an optimization configuration for the network;
   determining a number of groups to generate based at least in part on the first information, the second information, and the optimization configuration; and
   generating one or more groups of first radio access technology location identifiers mapped to second radio access technology location identifiers based at least in part on the first information, the second information, and the optimization configuration, each of the groups identifying information for inter-radio access technology communications.

2. The method of claim 1, wherein the first radio access technology is long term evolution.

3. The method of claim 2, wherein the attribute of service provided by the first radio access technology in the first area includes at least one of a physical cell identifier of the first area, quantity of tracking area updates within the first area, quantity of devices within the first area, type of devices within the first area, and a prevailing type of traffic within the first area.

4. The method of claim 2, wherein the first radio access technology location identifiers comprise at least one of a tracking area identifier and a tracking area list.

5. The method of claim 1, wherein the second radio access technology is one of WCDMA and GSM.

6. The method of claim 5, wherein the attribute of service provided by the second radio access technology in the second area includes at least one of a primary scrambling code of the second area, base station identity code, quantity of location area updates within the second area, quantity of devices within the second area, type of devices within the second area, and a prevailing type of traffic within the second area.

7. The method of claim 5, wherein the second radio access technology location identifiers comprise a location area identifier.

8. The method of claim 1, wherein the optimization configuration includes one or more of a weighting factor, a static parameter, a semi-static parameters, and a dynamic parameter for at least one of the first information and the second information.

9. The method of claim 1, wherein the network comprises at least one of a self-organizing engine and a self-optimizing engine.

10. The method of claim 1, wherein the first radio access technology and the second radio access technology comprise heterogeneous and/or overlaid radio access technologies.

11. The method of claim 1, wherein at least one of the first radio access technology and the second radio access technology include one or more of a macro node, a micro node, a pico node, a femto node, an indoor node, an outdoor node, and a home node.

12. The method of claim 1, wherein generating the groups comprises:
 associating a location identifier for the first radio access technology with a location identifier for the second radio access technology, wherein at least a portion of a coverage area of the first radio access technology overlaps with at least a portion of the a coverage area of the second radio access technology; and
 assigning the associated identifiers to one of the groups based at least in part on a proximity of the coverage areas for the associated identifiers to coverage areas for identifiers included in the groups.

13. A device for generating accurate wireless network access information for inter-radio access technology communications, the device comprising:
 a first planning information receiver configured to receive first information for a first area of a first radio access technology for a network, the first information indicating an attribute of service provided by the first radio access technology in the first area;
 a second planning information receiver configured to receive second information for a second area of a second radio access technology for the network, the second information indicating an attribute of service provided by the second radio access technology in the second area;
 a network information receiver configured to receive an optimization configuration for the network; and
 an access information generator configured to determine a number of groups to generate based at least in part on the first information, the second information, and the optimization configuration and to generate one or more groups of first radio access technology location identifiers mapped to second radio access technology location identifiers based at least in part on the first information, the second information, and the optimization configuration, each of the groups identifying information for inter-radio access technology communications.

14. The device of claim 13, wherein the first radio access technology is long term evolution.

15. The device of claim 14, wherein the attribute of service provided by the first radio access technology in the first area includes at least one of a physical cell identifier of the first area, quantity of tracking area updates within the first area, quantity of devices within the first area, types of devices within the first area, and a prevailing type of traffic within the first area.

16. The device of claim 14, wherein the first radio access technology location identifiers comprise at lease on of a tracking area identifier and a tracking area list.

17. The device of claim 13, wherein the second radio access technology is one of WCDMA and GSM.

18. The device of claim 17, wherein the second information includes at least one of a primary scrambling code of the second area, a base station identity code, quantity of location area updates within the second area, quantity of devices within the second area, types of devices within the second area, and a prevailing type of traffic within the second area.

19. The device of claim 17, wherein the second radio access technology location identifiers comprise a location area identifier.

20. The device of claim 13, wherein the optimization configuration includes one or more of a weighting factor, a static parameter, a semi-static parameters, and a dynamic parameter for at least one of the first information and the second information.

21. The device of claim 13, wherein the device is in data communication with at least one of a self-organizing engine and a self-optimizing engine.

22. The device of claim 13, wherein the first radio access technology and the second radio access technology comprise heterogeneous and/or overlaid radio access technologies.

23. The device of claim 13, wherein at least one of the first radio access technology and the second radio access technology include one or more of a macro node, a micro node, a pico node, a femto node, an indoor node, an outdoor node, and a home node.

24. The device of claim 13, wherein the access information generator is configured to generate the groups by:
 associating a location identifier for the first radio access technology with a location identifier for the second radio access technology, wherein at least a portion of a coverage area of the first radio access technology overlaps with at least a portion of the a coverage area of the second radio access technology; and
 assigning the associated identifiers to one of the groups based at least in part on a proximity of the coverage areas for the associated identifiers to coverage areas for identifiers included in the groups.

25. A non-transitory computer readable medium comprising instructions for generating accurate wireless network access information for inter-radio access technology communications that when executed cause an apparatus to:
 receive first information for a first area of a first radio access technology for a network, the first information indicating an attribute of service provided by the first radio access technology in the first area;
 receive second information for a second area of a second radio access technology for the network, the second information indicating an attribute of service provided by the second radio access technology in the second area;

receive an optimization configuration for the network;

determine a number of groups to generate based at least in part on the first information, the second information, and the optimization configuration; and generate one or more groups of first radio access technology location identifiers mapped to second radio access technology location identifiers based at least in part on the first information, the second information, and the optimization configuration, each of the groups identifying information for inter-radio access technology communications.

26. An apparatus for generating accurate wireless network access information for inter-radio access technology communications, the apparatus comprising:

means for receiving first information for a first area of a first radio access technology for a network, the first information indicating an attribute of service provided by the first radio access technology in the first area;

means for receiving second information for a second area of a second radio access technology for the network, the second information indicating an attribute of service provided by the second radio access technology in the second area;

means for receiving an optimization configuration for the network;

means for determining a number of groups to generate based at least in part on the first information, the second information, and the optimization configuration; and means for generating one or more groups of first radio access technology location identifiers mapped to second radio access technology location identifiers based at least in part on the first information, the second information, and the optimization configuration, of the groups identifying information for inter-radio access technology communications.

27. A method of generating accurate wireless network access information for inter-radio access technology communications, the method comprising:

receiving first information for a first area of a first radio access technology for a network, the first information indicating an attribute of service provided by the first radio access technology in the first area;

receiving second information for a second area of a second radio access technology for the network, the second information indicating an attribute of service provided by the second radio access technology in the second area;

receiving an optimization configuration for the network; and generating one or more groups of first radio access technology location identifiers mapped to second radio access technology location identifiers based at least in part on the first information, the second information, and the optimization configuration, each of the groups identifying information for inter-radio access technology communications, wherein the generating includes:

associating a location identifier for the first radio access technology with a location identifier for the second radio access technology, wherein at least a portion of a coverage area of the first radio access technology overlaps with at least a portion of the a coverage area of the second radio access technology; and assigning the associated identifiers to one of the groups based at least in part on a proximity of the coverage areas for the associated identifiers to coverage areas for identifiers included in the groups.

28. A device for generating accurate wireless network access information for inter-radio access technology communications, the device comprising:

a first planning information receiver configured to receive first information for a first area of a first radio access technology for a network, the first information indicating an attribute of service provided by the first radio access technology in the first area;

a second planning information receiver configured to receive second information for a second area of a second radio access technology for the network, the second information indicating an attribute of service provided by the second radio access technology in the second area;

a network information receiver configured to receive an optimization configuration for the network; and an access information generator configured to generate one or more groups of first radio access technology location identifiers mapped to second radio access technology location identifiers based at least in part on the first information, the second information, and the optimization configuration by: associating a location identifier for the first radio access technology with a location identifier for the second radio access technology, wherein at least a portion of a coverage area of the first radio access technology overlaps with at least a portion of the a coverage area of the second radio access technology, and by assigning the associated identifiers to one of the groups based at least in part on a proximity of the coverage areas for the associated identifiers to coverage areas for identifiers included in the groups, wherein each of the groups identifying information for inter-radio access technology communications.

29. A non-transitory computer readable medium comprising instructions for generating accurate wireless network access information for inter-radio access technology communications that when executed cause an apparatus to:

receive first information for a first area of a first radio access technology for a network, the first information indicating an attribute of service provided by the first radio access technology in the first area;

receive second information for a second area of a second radio access technology for the network, the second information indicating an attribute of service provided by the second radio access technology in the second area;

receive an optimization configuration for the network;

generate one or more groups of first radio access technology location identifiers mapped to second radio access technology location identifiers based at least in part on the first information, the second information, and the optimization configuration by associating a location identifier for the first radio access technology with a location identifier for the second radio access technology, wherein at least a portion of a coverage area of the first radio access technology overlaps with at least a portion of the a coverage area of the second radio access technology, and by assigning the associated identifiers to one of the groups based at least in part on a proximity of the coverage areas for the associated identifiers to coverage areas for identifiers included in the groups, wherein each of the groups identifying information for inter-radio access technology communications.

30. An apparatus for generating accurate wireless network access information for inter-radio access technology communications, the apparatus comprising:
- means for receiving first information for a first area of a first radio access technology for a network, the first information indicating an attribute of service provided by the first radio access technology in the first area;
- means for receiving second information for a second area of a second radio access technology for the network, the second information indicating an attribute of service provided by the second radio access technology in the second area;
- means for receiving an optimization configuration for the network; and
- means for generating one or more groups of first radio access technology location identifiers mapped to second radio access technology location identifiers based at least in part on the first information, the second information, and the optimization configuration, each of the groups identifying information for inter-radio access technology communications,
- wherein the means for generating includes means for associating a location identifier for the first radio access technology with a location identifier for the second radio access technology, wherein at least a portion of a coverage area of the first radio access technology overlaps with at least a portion of the a coverage area of the second radio access technology, and means for assigning the associated identifiers to one of the groups based at least in part on a proximity of the coverage areas for the associated identifiers to coverage areas for identifiers included in the groups.

* * * * *